United States Patent Office 3,254,103
Patented May 31, 1966

3,254,103
EIGHT COORDINATE TRIVALENT RARE EARTH METAL CHELATES WITH β-DIKETONES
Lester Russell Melby and Norman Jenisch Rose, Wilmington, Del., assignors to E. I. du Pont de Nemours and Company, Wilmington, Del., a corporation of Delaware
No Drawing. Filed Oct. 8, 1963, Ser. No. 314,619
20 Claims. (Cl. 260—429.2)

This invention relates to, and has as its principal object provisions of, a new class of chelate salts of the rare earth metals wherein the rare earth metal is both trivalent and eight coordinate and wherein the ligands are β-diketone residues.

Rare earth metal chelates are basically old. However, previously reported such β-diketone chelates have uniformly been formulated either as trivalent metal trischelates, i.e., where three moieties of the ligand were involved in the chelate structure, and where the rare earth metal in the chelate structure was trivalent and hexacoordinate with from 0 to 3 moles of water of hydration, or tetravalent metal tetrakischelates, i.e., where four moieties of the ligand were involved, with the metal being tetravalent and octacoordinate. Schematically, these previously known rare earth metal β-diketone chelates can be represented as

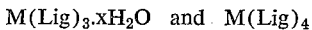

$M(Lig)_3 \cdot xH_2O$ and $M(Lig)_4$ wherein M represents the rare earth metal component of atomic number 57–71 and 89–103, usually of atomic number 57–71, inclusive, i.e., the lanthanides; Lig represents the combined β-diketone ligand(s), alike or different, including those from several β-diketones; and $x$ equals 0 to 3.

It has now surprisingly been discovered that an entirely new and unexpected type of chelate product can be prepared from rare earth metal salts and β-diketone ligands. This new class of rare earth metal chelate salts, in contrast to the just discussed, previously known rare earth metal chelates, contains in combined form four β-diketone ligand moieties and a cation, with the rare earth metal being formally trivalent but being octa- or eight coordinate. These new chelate salts can be represented by the schematic formula

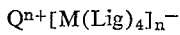

$Q^{n+}[M(Lig)_4]_n^-$ wherein M and Lig have their previously defined meanings and $Q^{n+}$ is used to represent a cation of valence $n$ where $n$ is an integer from 1 to 6 and preferably 1 to 3.

These new chelates can be described as being neutral in the overall molecular sense and as being eight coordinate trivalent rare earth metal chelate salts consisting of a cation and a singly charged anion in amount sufficient to balance the charge of said cation, said anion consisting of a trivalent rare earth metal and four β-diketone ligands linked in chelate form to said rare earth metal.

More particularly, the trivalent octacoordinate rare earth metal chelate salts of the present invention are those wherein the ligand moieties arise from compounds containing a β-diketone or, more broadly, a 1,3- or α,γ-dioxocarbonyl moiety. It is to be stressed that the 1,3-dicarbonylic units required in the ligand moieties are expressly exclusive of non-oxocarbonylic groups as defined in, for instance, the Classification Bulletin of the United States Patent Office, Class 260, at page 206-4, dated March 1956. Thus, the required 1,3-dicarbonylic moiety of the necessary ligands must have both of the C=O units bonded to hydrogen and/or carbon, i.e., both carbonylic units must be those of aldehyde and ketone functions and cannot be in either or both instances involved in carboxyl or any derived function thereof, including metal salt, ester, amide, quaternary ammonium salt, acid halide, or acyl peroxide.

The following structural formula affords a more detailed schematic representation of the present trivalent eight coordinate rare earth metal chelate salts with β-diketone ligands:

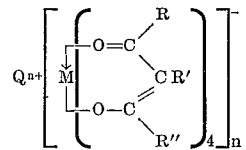

wherein $Q^{n+}$, $n$, and M have their previously described meanings and R, R', and R'', which can be alike or different, are monovalent hydrocarbon, e.g., alkyl, aryl, alkaryl, aralkyl, cycloalkyl, halohydrocarbon, preferably fluorocarbon, or heterocyclic radicals, generally of no more than 10–12 carbons each and free of aliphatic unsaturation; R' can also be Cl, Br, I, or CN.

The just defined R, R', and R'' can carry, if desired, such non-interfering functional substitutents as one or more halogens of atomic number from 9–53, inclusive; one or more hydrocarbon substituents of the types just defined; one or more hydrocarbyl ether or thioether substituents wherein the hydrocarbon moiety is as just defined; one or more hydrocarbyloxycarbonyl, i.e., carboxyester, substituent or mono- or dihydrocarbylaminocarbonyl, i.e., carboxamido, substituents wherein in all three types the hydrocarbyl substituents are as just defined; one or more hydrocarbylcarbonyl or thiocarbonyl substituents wherein the hydrocarbyl radicals are as just defined; and the like.

The cation portion of these new trivalent octacoordinate rare earth metal chelates can be any of the well-known cations including those of the elements of Groups I–A, II–A, etc., of the Periodic Table, e.g. Li$^+$, Na$^+$, K$^+$, Rb$^+$, Cs$^+$, Be$^{+2}$, Mg$^{+2}$, Ca$^{+2}$, Sr$^{+2}$, Ba$^{+2}$, as well as ammonium (NH$_4^+$) and substituted aminium and ammonium radicals from any mono- or polyamine of the general formulas:

R'''NH$_3^+$, R'''$_2$NH$_2^+$, R'''$_3$NH$^+$, R'''$_4$N$^+$, R'''NH$^+$, and R'''$_2$N$^+$

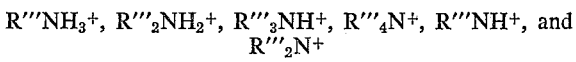

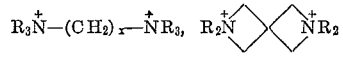

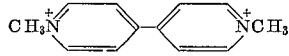

where the R'''s, alike or different, are any hydrocarbon or substituted hydrocarbon radicals such as the alkyl, aryl, cycloalkyl, aralkyl, and alkaryl monovalent hydrocarbon radicals, generally of no more than fourteen carbons each. In the di-, tri-, and tetrasubstituted ammonium cations, any two or more of the R'''s can be together joined to form with the said ammonium nitrogen a mono- or polycyclic nitrogen heterocycle. In these instances where two or more of the R'''s are together joined, they can be joined through oxygen, nitrogen, or sulfur-interrupted bridges to form with the said ammonium nitrogen, respectively, mono- or polycyclic oxaaza, diaza, and azathia heterocycles.

The just defined R'''s, like R, R', and R", can carry, if desired, such non-interfering functional substituents as one or more halogens of atomic number from 9–53, inclusive; one or more hydrocarbon substituents of the types just defined; one or more hydrocarbyl ether or thioether substituents wherein the hydrocarbon moiety is as just defined; one or more hydrocarbyloxycarbonyl, i.e. carboxyester, substituent or mono- or dihydrocarbylaminocarbonyl, i.e., carboxamido, substituents wherein in all three types the hydrocarbyl substituents are as just defined; one or more hydrocarbylcarbonyl or thiocarbonyl substituents wherein the hydrocarbyl radicals are as just defined; and the like.

The rare earth metal unit in these new trivalent octacoordinate rare earth metal chelates can be any one of the rare earth metals which are normally regarded as being members of the lanthanide or actinide series and are expressly inclusive of the transition rare earth metals running from atomic numbers 57–71 and 89–103 and preferably 57–71, i.e., inclusive of lanthanium, cerium, praseodymium, neodymium, promethium, samarium, europium, gadolinium, terbium, dysprosium, holmium, erbium, thulium, ytterbium, letetium, and the actinides, i.e., actinium, thorium, protactinium, uranium, neptunium, plutonium, americium, berkelium, californium, einsteinium, fermium, mendelevium, nobelium, and lawrencium.

The ligand moieties of these new octacoordinate trivalent rare earth metal chelate salts can also vary widely and include expressly all compounds of the basic structure

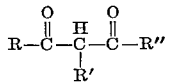

wherein the R, R', and R" radicals have their previously defined meanings. Suitable classes of useful ligands within the just defined generic scope include dialkyl β-diketones, e.g., pentane-2,4-dione,
hexane-2,4-dione,
heptane-2,4-dione,
heptane-3,5-dione,
nonadecane-9,11-dione,
9-methyloctadecane-8,10-dione,
tricosane-11,13-dione,
1,1,1,5,5,5-hexafluoropentane-2,4-dione,
1,1,1-trifluoropentane-2,4-dione,
1,1,1,19,19,19-hexafluorononadecane-9,11-dione;

alkylaryl β-diketones, e.g., 1-phenylbutane-1,3-dione,
1-phenyl-4,4,4-trifluorobutane-1,3-dione,
1-phenylundecane-1,3-dione,
1-(3,4-dimethylphenyl)-2-methyltridecane-1,3-dione,
1-(4-methoxyphenyl)-4,4,4-trifluorobutane-1,3-dione;
1-(2-thienyl)-4,4,4-trifluorobutane-1,3-dione,
1-(4-nitrophenyl)-4,4,4-trifluorobutane-1,3-dione,
1-(3-nitrophenyl)-4,4,4-trifluorobutane-1,3-dione,
1-phenyl-2-trifluoromethyl-4,4,4-trifluorobutane-1,3-dione;

and diaryl β-diketones, e.g.

1,3-diphenylpropane-1,3-dione,
1,3-(2,4-dimethylphenyl)propane-1,3-dione,
1-phenyl-3-(2-pyridyl)propane-1,3-dione,
1,3-di(4-pyridyl)propane-1,3-dione,
1-(4-methoxy)-3-(4-nitrophenyl)propane-1,3-dione,
1,3-di(4-nitrophenyl)propane-1,3-dione,
1,3-didurylpropane-1,3-dione,
1-furylbutane-1,3-dione,
1-thienylbutane-1,3-dione,
1-furyl-3-phenylpropane-1,3-dione,
1-furyl-3-thienylpropane-1,3-dione,
1,3-difurylpropane-1,3-dione,
1,3-dithienylpropane-1,3-dione, and
3-methylpentane-2,4-dione.

The following examples are submitted to illustrate further but not to limit this invention.

*Example I*

Tris(dibenzoylmethane)Eu(III) (0.4 g., 0.49 mmole) was dissolved in a minimum amount of hot ethanol. Also, 0.48 mmole of crude sodium dibenzoylmethide (0.12 g.) was separately dissolved in minimum amount of hot ethanol. The hot solutions were combined. Upon cooling, the solution deposited white needles which were collected, washed with cold ethanol, and dried overnight in high vacuum over $P_2O_5$. After drying, the needles appeared more nearly yellow. There was thus obtained sodium tetrakis(dibenzoylmethane)europium(III) melting at 166–169° C. with decomposition. More properly, the product is formally described as sodium tetrakis(1,3-diphenyl-1,3-propanediono)europium(III).

*Analysis.*—Calcd. for $C_{60}H_{44}O_8EuNa$: C, 67.5%; H, 4.2%. Found: C, 67.3%; H, 4.5%.

*Example II*

Sodium (0.1 g., 4.35 mmoles) was dissolved in ~20 ml. of ethanol. To this solution was added a solution of acetylacetone (0.43 g., 4.3 mmoles) in ~10 ml. of ethanol. Trisacetylacetone Eu(III) monohydrate (1.59 g., 3.4 mmoles) dissolved in ~50 ml. of absolute ethanol was added to the sodium acetylacetonate solution. A white precipitate formed immediately upon addition. The precipitate was isolated by filtration, washed with alcohol, and air dried for two days. The sample was then extracted for four hours with alcohol in a Soxhlet extractor. The solid was again isolated and air dried for eight hours. There was then obtained sodium tetrakis(acetylacetonate)europium(III) melting at 330–345° C. with charring. More properly, this chelate salt is named sodium tetrakis(2,4-pentanediono)europium(III).

*Analysis.*—Calcd. for $C_{20}H_{28}O_8EuNa$: C, 42.1%; H, 4.9%; Na, 4.0%. Found: C, 42.0%, 41.8%; H, 5.1%, 5.0%; Na, 4.1%.

*Example III*

Dibenzoylmethane (1.79 g., 8 mmoles) together with 25 ml. of ethanol and 15.85 ml. of aqueous 0.505 M KOH (8 mmoles) was heated together on a steam bath until all solids had dissolved. At this point 2 mmoles of $EuCl_3$ dissolved in 10 ml. of water were added slowly to the hot swirled solution. A yellow precipitate formed immediately. The mixture of precipitate and mother liquor was cooled to ~0° C. At this point the precipitate was isolated in a suction filter, washed with water, and sucked dry in the filter. The solid was dissolved in 200 ml. of hot o-dichlorobenzene (steam bath) and the resulting solution was then filtered. The crystals which deposited on cooling to room temperature were collected, washed with o-dichlorobenzene, and dried at 80° C. in high vacuum for 24 hours. There was thus obtained the chelate salt, potassium tetrakis(dibenzoylmethane)europium(III), i.e., potassium tetrakis(1,3-diphenyl-1,3-propanediono)europium(III).

*Analysis.*—Calcd. for $C_{60}H_{44}O_8EuK$: C, 66.5%; H, 4.1%; Eu, 14.0%; K, 3.6%. Found: C, 66.8%; H, 4.3%; Eu, 13.9%; K, 3.2%.

*Example IV*

Benzoylacetone (1.62 g., 10 mmoles) was dissolved in a mixture of 50 cc. acetone and 10 ml. of aqueous 1 N NaOH solution. Europium trichloride (2 mmoles in 10 ml. of $H_2O$) was added to the refluxing mixture. The resulting solution was filtered through coarse paper and set aside to cool to room temperature. The microneedles which were deposited were collected, washed with 50–50 acetone-$H_2O$ and dried overnight in high vacuum over $P_2O_5$. There was thus obtained sodium (acetylbenzoylmethane)europium(III), i.e., sodium tetrakis(1-methyl-3-phenyl-1,3-propanediono)europium(III), melting with decomposition at 220–245° C.

*Analysis.*—Calcd. for $C_{40}H_{36}O_8EuNa$: C, 58.6%; H, 4.4%; Eu, 18.6%; Na, 2.8%. Found: C, 58.8%; H, 4.6%; Eu, 18.1%; Na, 2.7%.

In much the same manner, additional cation tetrakis ligand trivalent octacoordinate rare earth metal chelate anion salts were prepared as given in Table I where, for brevity, the dibenzoylmethane ligand is identified as DBM and the acetylacetone ligand as AcAc. All melting points are reported with varying degrees of decomposition.

The preparative methods of the table are as follows: Method 1 corresponds to that given in detail in foregoing Example III, substituting the hydroxide or free base of the particular cation involved for the potassium hydroxide of Example III. Method 2 involves 8 mmoles of DBM, 8 mmoles of NaOH, 3–4 mmoles of $R_4NCl$, 25 ml. of ethanol, and 2 mmoles of $EuCl_3$ in 10 ml. of $H_2O$, with the procedure being the same as that of Method 1, i.e., Example III, in that the $EuCl_3$ solution was added to a hot solution of the first four enumerated reagents. Method 3 is as follows:

A mixture of acetylacetone (1.03 ml., 10 mmoles), aqueous KOH (19.8 ml. of 0.505 N, 10 mmoles), and 20 ml. EtOH was heated on a steam bath. To this hot solution was added 2 mmoles $EuCl_3$ in 10 ml. $H_2O$. A white cream-like precipitate settled immediately, followed by needle crystals. All solids were isolated on suction filter and washed with $H_2O$. The product was then extracted with 50 ml. boiling EtOH for ~10 minutes. The product was again isolated on a suction filter, washed with EtOH, and dried for 12 hours in high vacuum over $CaCl_2$.

thienyl)2,4-butanediono)europium(III) chelate sale as crystals melting at 136–138° C. The chelate salt exhibited a bright red fluorescence when exposed to 3660 A. ultraviolet light.

*Analysis.*—Calcd. for $C_{38}H_{32}F_{12}O_8S_4NEu$: C, 39.9%; H, 2.8%; S, 11.3%; Eu, 13.4%. Found: C, 39.7%; H, 3.0%; S, 11.5%; Eu, 13.4%.

The chelate salt was obtained in somewhat better yield by a slight variation in the preparative procedure. Thus, in 60 ml. of 2B alcohol was dissolved 4.0 g. (18 millimoles) of thenoyltrifluoroacetone and 2.5 ml. (18 millimoles) of triethylamine was added. The solution was heated just to boiling, a solution of 4 millimoles of europium chloride in 20 ml. of water was added, and the mixture was allowed to stand overnight at ambient temperature. The resultant solid product was removed by filtration, washed with water on the filter, and dried in a vacuum desiccator over $P_2O_5$. There was thus obtained 4.2 parts (92% of theory) of the triethylammonium tetrakis(1,1,1-trifluoro-4-(2-thienyl) - 2,4 - butanediono)-europium(III) chelate salt as yellowish crystals melting at 133–134° C. with decomposition.

*Analysis.*—Calcd. for $C_{38}H_{32}F_{12}O_8S_4NEu$: C, 39.9%; H, 2.8%; F, 20.0%; S, 11.3%; Eu, 13.4%. Found: C, 39.7%; H, 3.3%; F, 20.2%; S, 11.2%; Eu, 13.3%.

Using slight process variations and other cation sources, other trivalent eight coordinate tetrakis(thenoyl)trifluoroacetone europium(III) and other rare earth metal salts chelates were obtained in accord with Table 2 following. The methods of preparation referred to therein as A and B follow in detail.

(A) In 60 ml. of boiling 2B alcohol was dissolved 18 mmoles of β-diketone and 18 mmoles of amine was added. The solution was heated to boiling and 4 mmoles of rare earth salt in 20 ml. of water was added, the solution heated again to boiling, filtered hot, and allowed to stand overnight at room temperature to afford analytically pure, crystalline chelate.

(B) In 25 ml. of 2B alcohol was dissolved 6 mmoles of β-diketone and 2 mmoles of europium chloride was added (in 10 ml. of water). Then 1.0 ml. of 2,4,6-trimethylpyridine was added from a pipet and the solution was swirled while 100 ml. of water was added. The oily product solidified when vigorously scratched. It was collected on a filter, air dried, dissolved in 25 ml. of benzene, treated with magnesium sulfate, and the solution filtered. The solution was heated to boiling and treated with boiling n-hexane until just cloudy. This solution was allowed to stand overnight at room temperature to obtain the analytically pure chelate.

TABLE 1

| Compound | Percent C | | Percent H | | Percent Eu | | Percent N | | Percent Other | | Prep. Method | Recrystallized from— | M.P., °C. |
|---|---|---|---|---|---|---|---|---|---|---|---|---|---|
| | Calcd. | Found | Calcd. | Found | Calcd. | Found | Calcd. | Found | Calcd. | Found | | | |
| $Et_4N[Eu(DBM)_4]$ | 69.5 | 69.5 | 5.5 | 5.6 | 12.9 | 12.8 | 1.2 | 1.2 | | | 2 | o-Dichlorobenzene. | 230–243 |
| $Na[Eu(DBM)_4]$ | 67.5 | 67.2 | 4.2 | 4.2 | 14.2 | 14.1 | | | Na 2.2 | Na 2.0 | 1 | Ethanol. | 1 167–170 |
| $Cs[Eu(DBM)_4]$ | 61.2 | 60.9 | 3.8 | 3.8 | 12.9 | 12.6 | | | Cs 11.3 | Cs 9.9 | 1 | o-Dichlorobenzene. | 280–307 |
| $Rb[Eu(DBM)_4]$ | 63.8 | 63.8 | 3.9 | 4.0 | 13.5 | 13.1 | | | Rb 7.6 | Rb 6.9 | 1 | do. | 286–302 |
| $Na[Eu(AcAc)_4]$ | | | | | | | | | | | 1 | Nothing. | |
| Piperidinium-[$Eu(DBM)_4$]. | 69.0 | 69.6 / 69.2 | 5.0 | 5.0 / 4.7 | 13.5 | 13.3 | 1.2 | 1.2 | | | 1 | Ethanol. | 190–191 |
| $Et_3NH[Eu(DBM)_4]$ | 69.1 | 69.0 | 5.3 | 5.1 | 13.3 | 13.3 | 1.2 | 1.3 | | | 1 | do. | 1 175–181 |
| $(CH_3)_4N[Eu(DBM)_4]$ | 68.7 | 68.3 | 5.1 | 5.0 | 13.6 | 13.5 | 1.3 | 1.1 | | | 2 | o-Dichlorobenzene. | 259–270 |
| $K[Eu(AcAc)_4]$ | 40.9 | 41.0 | 4.8 | 5.0 | 25.9 | 25.5 | | | K 6.7 | K 7.3 | 3 | Nothing. | 225 |

[1] Rate of heating important.

*Example V*

In 20 parts of ethyl alcohol was dissolved 1.34 parts (6 moles) of thenoyltrifluoroacetone and 0.6 part (6 moles) of triethylamine. The solution was filtered and a solution of 0.52 part (2 moles) of europium(III) chloride in 10 parts of water was added. The clear reaction mixture was seeded with several crystals from a previous preparation to ensure better crystal formation and, while stirring, water (100 parts) was slowly added. A crystalline solid separated. The mixture was heated to 45° C. and the solid was collected on a suction filter and was washed on the filter with water. It was dried in a vacuum desiccator over $P_2O_5$. There was thus obtained 1.55 parts of the triethylammonium tetrakis(1,1,1-trifluoro-4-(2-

TABLE 2

| Chelate | Method | Yield, Percent | M.P., °C. | Percent C | | Percent H | | Percent F | | Percent S | | Percent Metal | |
|---|---|---|---|---|---|---|---|---|---|---|---|---|---|
| | | | | Calcd. | Found | Calcd. | Found | Calcd. | Found | Calcd. | Found | Calcd. | Found |
| Pyridinium tetrakis-(1,1,1-trifluoro-4-(2-thienyl)-2,4-butanediono)europium(III). | A | 76 | 195–196 (dec.) | | | | | 20.3 | 20.2 | 11.4 | 11.3 | 13.5 | 13.4 |
| 2,4,6-trimethylpyridinium tetrakis-(1,1,1-trifluoro-(2-thienyl)2,4-butanediono) europium(III). | B | 23 | 158–160 (dec.) | 41.5 | 41.7 | 2.4 | 2.6 | 19.7 | 19.4 | 11.1 | 11.1 | 13.1 | 13.0 |
| Triethylammonium tetrakis (1,1,1-trifluoro-4-(2-thienyl)-2,4-butanediono)-terbium(III). | A | 96 | 158–163 (dec.) | 39.8 | 39.3 | 2.8 | 3.4 | 19.9 | 19.7 | 11.2 | 11.2 | 13.9 | 13.4 |
| Pyridinium tetrakis-(1,1,1-trifluoro-4-(2-thienyl)-2,4-butanediono)terbium-(III). | A | 56 | 193–195 (dec.) | 39.2 | 39.6 | 2.0 | 2.3 | 20.1 | 20.4 | 11.3 | 11.4 | 14.0 | 13.1 |

Using still other variations in process conditions, cations, chelate, ligands, and rare earth metal salts, additional examples of the cation tetrakis-ligand octa-coordinate trivalent rare earth metal chelate salts of the present invention were prepared, the data for which appear in Table 3 following. The methods of preparation used therein follow. The specific methods used for each preparation are indicated by an * following the yield figures for method A and no mark for method B.

(A) In 60 ml. of boiling 2B alcohol was dissolved 18 mmoles of β-diketone and 18 mmoles of amine was added. The solution was heated to boiling and 4 mmoles of rare earth metal salt in 20 ml. of water was added, the solution heated again to boiling and filtered hot. In some instances the chelate began separating as an oil during the initial phase of cooling in which case crystallization was induced either by gentle swirling of the cloudy solution or by brief scratching of the inner surface of the flask with a glass rod. The mixture was allowed to stand overnight at room temperature to afford analytically pure, crystalline chelate.

(B) Into 60 ml. of 2B alcohol was pipetted 3.6 ml. of hexafluoroacetylacetone and 20 millimoles of amine and a solution of 5 millimoles of rare earth salt in 25 ml. of water was added. The solution was boiled down to half its original volume on a steam bath and then 100 ml. of water was added. The precipitated solid was vigorously scratched, collected on a filter, and boiled with about 100 ml. of hexane to obtain a granular solid. This product was recrystallized from chloroform.

TABLE 3

| Chelate | Yield, Percent | M.P., °C. dec. | Percent C | | Percent H | | Percent F | | Percent Metal | |
|---|---|---|---|---|---|---|---|---|---|---|
| | | | Calcd. | Found | Calcd. | Found | Calcd. | Found | Calcd. | Found |
| Triethylammonium tetrakis-(1,1,1,5,5,5-hexafluoro-2,4-pentanediono)europium(III) | 30 | ~130 | 28.9 | 29.0 | 1.8 | 1.4 | 42.1 | 42.4 | 14.1 | 13.9 |
| Pyridinium tetrakis-(1,1,1,5,5,5-hexafluoro-2,4-pentanediono)europium(III) | 38 | ~175 | 28.3 | 28.6 | 0.9 | 1.3 | 43.0 | 43.2 | 14.3 | 14.6 |
| 2,6-dimethylpyridinium tetrakis(1,1,1,5,5,5-hexafluoro-2,4-pentanediono)europium(III) | 22 | ~130 | 29.8 | 30.2 | 1.3 | 1.4 | | 42.2 | 14.0 | 13.6 |
| 2,4,6-trimethylpyridinium-tetrakis(1,1,1,5,5,5-hexafluoro-2,4-pentanediono)-europium(III) | 18 | ~130 | 30.5 | 30.7 | 1.5 | 1.6 | 41.4 | 41.6 | 13.8 | 13.8 |
| Piperazinium tetrakis-(1,1,1,5,5,5-hexafluoro-2,4-pentanediono)europium(III) | 12 | ~210 | 27.0 | 27.5 | 1.4 | 1.6 | 42.8 | 42.6 | 14.2 | 13.8 |
| Triethylammonium tetrakis-(1,1,1-trifluoro-4-phenyl-2,4-butanediono)europium(III) | *78 | 108–110 | 49.6 | 49.1 | 3.6 | 4.0 | 20.5 | 20.7 | 13.7 | 13.5 |
| Triethylammonium tetrakis(1,1,1-trifluoro-4-phenyl-2,4-butanediono)terbium(III) | *28 | ~130 | 28.7 | 28.6 | 1.8 | 2.0 | 41.9 | 42.1 | 14.6 | 14.3 |
| Pyridinium tetrakis-(1,1,1,5,5,5-hexafluoro-2,4-pentanediono)terbium(III) | 30 | ~185 | 28.2 | 28.5 | 0.8 | 1.2 | 42.8 | 42.4 | 14.9 | 14.9 |
| 2,6-dimethylpyridinium tetrakis(1,1,1,5,5,5-hexafluoro-2,4-pentanediono)terbium(III) | 31 | ~130 | 29.6 | 29.7 | 1.3 | 1.4 | 41.6 | 41.5 | 14.5 | 14.5 |
| 2,4,6-trimethylpyridinium tetrakis(1,1,1,5,5-hexafluoro-2,4-pentanediono)terbium(III) | 39 | ~135 | 30.4 | 30.8 | 1.5 | 1.6 | 41.1 | 40.9 | 14.3 | 14.3 |
| Triethylammonium tetrakis-(1,1,1-trifluoro-4-phenyl-2,4-butanediono)terbium(III) | *59 | ~130 | 49.2 | 49.2 | 3.6 | 3.6 | 20.3 | 20.5 | 14.1 | 14.5 |
| Triethylammonium tetrakis-(1,1,1,5,5,5-hexafluoro-2,4-pentanediono)neodymium(III) | 36 | ~130 | 29.0 | 29.0 | 1.9 | 2.1 | 42.7 | 42.7 | 13.4 | 12.9 |
| Pyridinium tetrakis-(1,1,1,5,5,5-hexafluoro-2,4-pentanediono)neodymium(III) | 49 | ~185 | 28.5 | 28.6 | 1.0 | 1.4 | 43.3 | 43.0 | 13.7 | 13.2 |
| 2,6-dimethylpyridinium tetrakis(1,1,1,5,5,5-hexafluoro-2,4-pentanediono)neodymium(III) | 48 | ~130 | 30.0 | 30.5 | 1.3 | 1.6 | 42.2 | 42.5 | 13.4 | 13.0 |
| Triethylammonium tetrakis-(1,1,1-trifluoro-4-phenyl-2,4-butanediono)neodymium(III) | *43 | ~130 | 49.9 | 50.4 | 3.6 | 3.9 | 20.6 | 20.4 | 13.0 | 13.0 |
| Triethylammonium tetrakis-(1,1,1-trifluoro-4-(2-thienyl)-2,4-butanediono)-neodymium(III) | *81 | ~135 | 40.1 | 40.4 | 2.9 | 3.0 | 20.2 | 20.3 | 12.8 | 12.4 |
| Triethylammonium tetrakis-(1,1,1,5,5,5-hexafluoro-2,4-pentanediono)lanthanum(III) | 28 | ~130 | 29.2 | 29.3 | 1.9 | 2.2 | 42.6 | 42.3 | 13.0 | 12.5 |
| 2,6-dimethylpyridinium tetrakis(1,1,1,5,5,5-hexafluoro-2,4-pentanediono)lanthanum(III) | 47 | ~130 | 30.2 | 29.8 | 1.3 | 1.5 | 42.4 | 42.4 | 12.9 | 12.4 |
| Triethylammonium tetrakis(1,1,1-trifluoro-4-phenyl-2,4-butanediono)lanthanum(III) | *43 | ~130 | 50.1 | 50.4 | 3.7 | 3.5 | 20.6 | 20.6 | 12.6 | 12.3 |
| Triethylammonium tetrakis(1,1,1-trifluoro-4-(2-thienyl)-2,4-butanediono)lanthanum(III) | *64 | ~135 | 40.5 | 41.0 | 2.9 | 3.1 | 20.3 | 20.3 | 12.3 | 11.8 |

Example VI

In a 250 ml. Erlenmeyer flask was placed (in order) 50 ml. of 2B alcohol, 3.1 ml. of triethylamine, 3.6 ml. of hexafluoroacetylacetone and then a solution of 2.2 g. (5 mmoles) or $Pr(NO_3)_3 \cdot 6H_2O$ in 25 ml. of water. The solution was boiled down to half of its original volume and 100 ml. of water was added to precipitate a sticky solid. Vigorous scratching converted it to a granular product which was collected on a filter, washed with water and air dried to obtain 4.6 g. of light green solid. Recrystallization from 40 ml. of chloroform afforded 3.0 parts (56% of theory) of the triethylammonium tetrakis (1,1,1,5,5,5-hexafluoro-2,4 - pentanediono)praseodymium (III) chelate salt as green crystals melting at 130–135° C. with decomposition.

Similar results were achieved in obtaining the samarium, gadolinium, dysprosium, holmium, erbium, and ytterbium chelate salts. The data for all seven of these products follow in Table 4.

TABLE 4

| M | Percent C | | Percent H | | Percent F | |
|---|---|---|---|---|---|---|
| | Calcd. | Found | Calcd. | Found | Calcd. | Found |
| Pr | 29.2 | 28.9 | 1.9 | 2.2 | 42.5 | 42.3 |
| Sm | 28.9 | 29.0 | 1.9 | 2.1 | 13.9 (Sm) | 13.7 |
| Gd | 28.8 | 28.7 | 1.8 | 2.2 | 14.4 (Gd) | 14.0 |
| Dy | 28.6 | 28.5 | 1.9 | 2.2 | 41.7 | 41.7 |
| Ho | 28.5 | 28.4 | 1.8 | 2.2 | 41.6 | 40.5 |
| Er | 28.5 | 28.5 | 1.8 | 2.3 | 41.5 | 41.2 |
| Yb | 28.2 | 28.0 | 1.8 | 2.0 | 41.1 | 41.2 |

Example VII

In 50 ml. of 2B alcohol was placed 4.32 g. (20 mmoles) of benzoyltrifluoroacetone and 1.1 g. (5 mmoles) of tetraethylammonium bromide. The mixture was heated to boiling and 20 ml. of 1 N NaOH was pipetted in followed by a solution of 2.2 g. (5 mmoles) of $$Eu(NO_3)_3 \cdot 6H_2O$$

in 20 ml. of warm water. The mixture was allowed to stand at room temperature for two days, the crystalline product was collected on a filter, washed with 50% alcohol and dried. There was thus obtained 2.9 parts (50% of theory) of tetraethylammonium tetrakis(1,1,1-trifluoro-4-phenyl-2,4-butanediono)europium(III) melting at 152–154° C. with decomposition.

*Analysis.*—Calcd. for $C_{48}H_{44}F_{12}NO_8Eu$: C, 50.0%; H, 3.9%; F, 19.9%. Found: C, 50.2%; H, 3.6%; F, 20.2%.

Example VIII

In 50 ml. of 2B alcohol at room temperature was dissolved 1.1 g. of tetraethylammonium bromide and 20 ml. of 1 N NaOH was pipetted in. Then 3.2 ml. of hexafluoroacetylacetone was pipetted in and a solution of 2.2 g. of $Eu(NO_3)_3 \cdot 6H_2O$ in 20 ml. of water was added. The mixture was heated just to boiling, filtered, and the filtrate allowed to stand at about 4° C. in a cold room overnight. The solid was collected on a filter and washed with ice-cold 50% ethanol. The air-dried crystalline product (1.6 g.) was recrystallized from a mixture of 85 ml. of chloroform and 12 ml. of ethanol to recover 1.3 g. of tetraethylammonium tetrakis(1,1,1,5,5,5-hexafluoro-2,4-pentanediono)europium(III) as white needles melting at 153–155° C. with decomposition.

*Analysis.*—Calcd. for $C_{28}H_{24}F_{24}NO_8Eu$: C, 30.3%; H, 2.2%; F, 41.1%. Found: C, 30.9%, 30.5%; H, 2.6%, 2.4%; F, 41.5%.

Example IX

To 50 ml. of 2B alcohol was added, in this specific order, 20 ml. of 1 N sodium hydroxide solution, 3.2 ml. of hexafluoroacetylacetone, then a solution of 2.2 g. of $Eu(NO_3)_3 \cdot 6H_2O$ in 20 ml. of water, and finally a solution of 2.0 g. of tetramethylammonium chloride in 10 ml. of water. The solution was concentrated by boiling on a steam bath until crystallization had begun, then just sufficient ethanol was added to dissolve the solid while at the boiling point. The solution was gravity filtered and let stand overnight at room temperature to afford white needles which were collected on a filter and washed with ice-cold (30° C.) ethanol. There was thus obtained 1.6 parts of tetramethylammonium tetrakis(1,1,1,5,5,5 - hexafluoro - 2,4 - pentanediono)europium(III) melting at ~190° C. with decomposition.

*Analysis.*—Calcd. for $C_{24}H_{16}F_{12}NO_8Eu$: C, 27.4%; H, 1.5%; F, 43.3%. Found: C, 27.6%; H, 1.8%; F, 43.4%.

Example X

The procedure of Example IX was repeated up to the point of the quaternary salt addition, and at that point a solution of 1.5 g. of quinoline methiodide in 10 ml. of water was added instead of the tetramethylethylammonium chloride. The solution was boiled down to half the original volume and 50 ml. of water was added. An oil separated and solidified. The solid was collected and recrystallized from 35 ml. of 50% alcohol. There was thus obtained 0.9 g. of N-methylquinolinium tetrakis(1,1,1,5,5,5 - hexafluoro - 2,4 - pentanediono)europium(III) melting at 100–103° C. with decomposition.

*Analysis.*—Calcd. for $C_{30}H_{14}F_{12}NO_8Eu$: C, 32.0%; H, 1.3%; F, 40.6%. Found: C, 32.3%; H, 1.5%; F, 41.0%.

Example XI

The procedure of Example X was carried out but 1.5 g. of N-methylphenazinium methylsulfate in 15 ml. of water was used in place of the quinoline methiodide. The alcohol solution was heated on a steam bath, gravity filtered, and ice cooled. There was thus obtained 1.6 parts of N-methylphenazinium tetrakis(1,1,1,5,5,5-hexafluoro-2,4-pentanediono)europium(III) as deep yellow needles melting at 120–123° C. with decomposition.

*Analysis.*—Calcd. for $C_{33}H_{15}F_{24}NO_8Eu$: C, 33.7%; H, 1.3%; F, 38.8%. Found: C, 34.0%; H, 1.5%: F, 38.8%.

Example XII

In a boiling mixture of 15 ml. of chloroform and 2 ml. of ethanol was dissolved 0.3 g. each of tetraethylammonium tetrakis(1,1,1 - trifluoro - 4 - phenyl-2,4-butanediono) europium(III) and tetraethylammonium tetrakis(1,1,1,5, 5,5 - hexafluoropentanediono)europium(III). The solution was refrigerated overnight and the white crystalline solid was collected on a filter and dried. There was thus obtained 0.4 part of tetraethylammonium bis(1,1,1-trifluoro - 4 - phenyl - 2,4 - butanediono)bis(1,1,1,5,5,5-hexafluoro-2,4-pentanediono)europium(III).

*Analysis.*—Calcd. for $C_{38}H_{34}NF_{18}O_8Eu$: C, 40.5%; H, 3.0%. Found: C, 39.5%, 39.4%; H, 3.0%, 3.2%.

Example XIII

A mixture of 1.3 parts (8 mmoles) of benzoyl acetone ligand, 20 cc. of ethyl alcohol, and 0.79 ml. (8 mmoles) of piperidine was heated to the reflux. A solution of 2 mmoles of europium trichloride in 10 cc. of water was added and the resultant reaction mixture was allowed to stand overnight under room conditions. The resultant solid comprising highly fluorescent prisms and a small amount of amorphous yellow solid was removed by suction-filtration, washed with water, and air-dried on the filter. The fluorescent prisms were mechanically separated from the amorphous solid and dried overnight under high vacuum over anhydrous $P_2O_5$. There was thus obtained 1.0 g. of piperidinium tetrakis(1-phenyl-1,3-butanediono)europium(III) as fluorescent prisms melting at 132–136° C.

*Analysis.*—Calcd. for $C_{45}H_{48}O_8NEu$: C, 61.2%; H, 6.1%; N, 1.6%; Eu, 17.2%. Found: C, 61.3%; H, 5.4%; N, 1.6%; Eu, 17.2%.

*Example XIV*

A solution was prepared at room temperature from 1.3 g. (8 mmoles) of benzoylacetone and 0.85 ml. (8.6 mmoles) of piperidine in 20 ml. of ethanol. The solution was stirred vigorously, and a solution of 2 mmoles of europium trichloride in 10 ml. of water was added. A gum formed in the reaction mixture and about 80 ml. additional water was added with vigorous stirring, which was continued for about two hours. The resultant solid precipitate was removed by vacuum-filtration, washed with water, and sucked dry on the filter. The solid product was then dissolved in 15 ml. of boiling ethanol and the resultant hot solution filtered through coarse filter paper. The filtrate was placed in a cold room (4° C.) overnight and the resultant light yellow crystals of the piperidinium tetrakis(1 - phenyl - 1,3 - butanediono)europium(III) chelate salt was removed by filtration, washed with ethanol, and dried overnight in a high-vacuum oven over $P_2O_5$.

These new trivalent octacoordinate rare earth metal chelate salts are prepared generically in basically the same fashion by reaction between the requisite rare earth metal salt, the requisite chelate ligand in the required at least four molar stoichiometry, and the base of the cation precursor in at least the required four molar stoichiometry or a neutral salt of the cation in at least one molar stoichiometric proportion plus a particular base in at least four molar stoichiometric proportions. However, within the broad genus here involved, the required preparative conditions will vary as a function of both the cation precursor and the ligand moieties involved. Thus, for a given class of ligands, various base strengths of the base serving as a cation precursor will be required. Similarly, varying as a function of either or both the base strength of the cation precursor or the chelating strength or chelating tendency of the ligand moiety, added bases will be required. Also varying as a function of any one or all the solubility tendencies of the cation precursor of the simple rare earth metal salt, or of the desired product, and/or of the specific chelate-forming ligand involved, variations in the solvent system used will also arise. More specifically, taking the above defined classes of chelate-forming ligands, the necessary process conditions for forming other new trivalent eight-coordinate rare earth metal chelate salts of the present invention follow.

At least 4 molar proportions of 1,1,1-trifluoropentane-2,4-dione are mixed with at least 4 molar proportions of pyrrolidine together with enough acetone or ethanol to effect solution. To this solution, preferably stirred, is added 1 molar proportion of europium(III) chloride dissolved in 5 ml. of $H_2O$. Precipitation of the product is completed by adding to the reaction mixture a volume of $H_2O$ equal to the volume of the original organic solvent. The solid pyrrolidinium tetrakis(1,1,1-trifluoropentane-2,4-diono)europium(III) chelate salt which forms is isolated, washed with solvent, and dried.

At least 4 molar proportions of 1-furyl-3-thienylpropane-1,3-dione, 8 ml. of 1 N NaOH and at least 1 molar proportion of N-ethylpyridinium bromide are mixed together with enough acetone or ethanol to effect solution. To this solution, preferably stirred, is added 1 molar proportion of ytterbium(III) chloride dissolved in 5 ml. of $H_2O$. Precipitation of the product is completed by adding to the reaction mixture a volume of $H_2O$ equal to the volume of the original organic solvent. The solid N-ethylpyridinium tetrakis(1-furyl-3-thienylpropane-1,3-diono)ytterbium(III) chelate salt which forms is isolated, washed with solvent, and dried.

At least 4 molar proportions of 1,1,1,19,19,19-hexafluorononadecane-9,11-dione are mixed with at least 4 molar proportions of quinoline together with enough acetone or ethanol to effect solution. To this solution, preferably stirred, is added 1 molar proportion of gadolinium(III) chloride dissolved in 5 ml. of $H_2O$. Precipitation of the product is completed by adding to the reaction mixture a volume of $H_2O$ equal to the volume of the organic solvent. The solid quinolinium tetrakis-(1,1,1,19,19,19-hexafluorononadecane-9,11 - diono)gadolinium(III) chelate salt which forms is isolated, washed with solvent and dried.

At least 4 molar proportions of 1-furyl-3-phenylpropane-1,3-dione, 8 ml. of 1 N NaOH, and at least 1 molar proportion of N-methylpyridinium bromide are mixed together with enough acetone or ethanol to effect solution. To this solution, preferably stirred, is added 1 molar proportion of thulium(III) chloride dissolved in 5 ml. of $H_2O$. Precipitation of the product is completed by adding to the reaction mixture a volume of $H_2O$ equal to the volume of the original organic solvent. The solid N-methylpyridinium tetrakis(1-furyl-3-phenylpropane - 1,3-diono)thulium(III) chelate salt which forms is isolated, washed with solvent, and dried.

At least 4 molar proportions of 3-bromopentane-2,4-dione are mixed with at least 4 molar proportions of 2-methylpiperidine together with enough acetone or ethanol to effect solution. To this solution, preferably stirred, is added 1 molar proportion of terbium(III) chloride dissolved in 5 mg. of $H_2O$. Precipitation of the product is completed by adding to the reaction mixture a volume of $H_2O$ equal to the volume of the original organic solvent. The solid 2-methylpyridinium tetrakis(3-bromopentane-2,4-diono)terbium(III) chelate salt which forms is isolated, washed with solvent, and dried.

At least 4 molar proportions of 1,3-difuryl-propane-1,3-dione, 8 ml. of 1 N NaOH, and at least 1 molar proportion of tetrapropylammonium chloride are mixed together with enough acetone or ethanol to effect solution. To this solution, preferably stirred, is added 1 molar proportion of erbium(III) chloride dissolved in 5 ml. of $H_2O$. Precipitation of the product is completed by adding to the reaction mixture a volume of $H_2O$ equal to the volume of the original organic solvent. The solid tetrapropyl-ammonium tetrakis(1,3-difurylpropane-1,3-diono) erbium(III) chelate salt which forms is isolated, washed with solvent and dried.

At least 4 molar proportions of 3-cyanopentane-2,4-dione are mixed with at least 4 molar proportions of 2-ethylpiperidine together with enough acetone or ethanol to effect solution. To this solution, preferably stirred, is added 1 molar proportion of dysprosium(III) chloride dissolved in 5 ml. of $H_2O$. Precipitation of the product is completed by adding to the reaction mixture a volume of $H_2O$ equal to the volume of the original organic solvent. The solid 2-ethylpiperidinium tetrakis(3-cyanopentane - 2,4 - diono)dysprosium(III) chelate salt which forms is isolated, washed with solvent, and dried.

At least 4 molar proportions of 1,3-dithienylpropane-1,3-dione, 2 ml. of 1 N NaOH and at least 1 molar proportion of tetrabutylammonium chloride are mixed together with enough acetone or ethanol to effect solution. To this solution, preferably stirred, is added 1 molar proportion of holmium (III) chloride dissolved in 5 ml. of $H_2O$.

Precipitation of the product is completed by adding to the reaction mixture a volume of $H_2O$ equal to the volume of the original organic solvent. The solid tetrabutylammonium tetrakis(1,3-dithienylpropane-1,3-diono) holmium(III) chelate salt which forms is isolated, washed with solvent, and dried.

At least 4 molar proportions of hexane-2,4-dione are mixed with at least 4 molar proportions of N-methylpiperidine together with enough acetone or ethanol to effect solution. To this solution, preferably stirred, is added 1 molar proportion of lanthanum(III) chloride dissolved in 5 ml. of $H_2O$. Precipitation of the product is completed by adding to the reaction mixture a volume of $H_2O$ equal to the volume of the original organic solvent. The solid N-methylpiperidinium tetrakis(hexane-2,4-diono)lanthanum(III) chelate salt which forms is isolated, washed with solvent, and dried.

At least 4 molar proportions of 1-(4-methoxyphenyl)-4,4,4-trifluorobutane-1,3-dione, 8 ml. of 1 N NaOH, and at least ½ molar proportion of 2,2,6,6,-tetramethyl-2,6-diazoniaspiro[3,3]heptane bromide[1] are mixed together with enough acetone or ethanol to effect solution. To this solution, preferably stirred, is added 1 molar proportion of lutetium(III) nitrate dissolved in 5 ml. of $H_2O$. Precipitation of the product is completed by adding to the reaction mixture a volume of $H_2O$ equal to the volume of the original organic solvent. The solid 2,2,6,6-tetramethyl-2,6 - diazoniaspiroheptane bis[tetrakis(1 - (4-methoxyphenyl)-4,4,4-trifluorobutane - 1,3 - diono)lutetium(III)] chelate salt which forms is isolated, washed with solvent, and dried.

At least 4 molar proportions of heptane-2,4-dione are mixed with at least 4 molar proportions of N-ethylpiperidine together with enough acetone or ethanol to effect solution. To this solution, preferably stirred, is added 1 molar proportion of cerium(III) chloride dissolved in 5 ml. of $H_2O$. Precipitation of the product is completed by adding to the reaction mixture a volume of $H_2O$ equal to the volume of the original organic solvent. The solid N-ethylpiperidinium tetrakis(heptane-2,4-diono)cerium(III) chelate salt which forms is isolated, washed with solvent, and dried.

At least 4 molar proportions of 1-(3,4-dimethylphenyl)-2-methyltridecane-1,3-dione, 8 ml. of 1 N NaOH, and at least ½ molar proportion of N,N′-diethyl-4,4′-dipyridylium bromide are mixed together with enough acetone or ethanol to effect solution. To this solution, preferably stirred, is added 1 molar proportion of ytterbium(III)) nitrate dissolved in 5 ml. of $H_2O$. Precipitation of the product is completed by adding to the reaction mixture a volume of $H_2O$ equal to the volume of the original organic solvent. The solid N,N′-diethyl-4,4′-dipyridylium bis[tetrakis(1-(3,4-dimethylphenyl)-2-methyltridecane-1,3-diono)ytterbium(III)] chelate salt which is isolated, washed with solvent, and dried.

At least 4 molar proportions of heptane-3,5,-dione are mixed with at least 4 molar proportions of N-propylpiperidine together with enough acetone or ethanol to effect solution. To this solution, preferably stirred, is added 1 molar proportion of praesodyminum(III) chloride dissolved in 5 ml. of $H_2O$. Precipitation of the product is completed by adding to the reaction mixture a volume of $H_2O$ equal to the volume of the original organic solvent. The solid N-propylpiperidinium tetrakis(heptane-3,5-diono)-praesodymium(III) chelate salt which forms is isolated, washed with solvent, and dried.

At least 4 molar proportions of 1-phenylundecane-1,3-dione, 8 ml. of 1 N NaOH, and at least ½ molar proportion of N,N′-dimethyl-4,4′-dipyridylium bromide are mixed together with enough acetone or ethanol to effect solution. To this solution, preferably stirred, is added 1 molar proportion of thulium(III) nitrate dissolved in 5 ml. of $H_2O$. Precipitation of the product is complete by adding to the reaction mixture a volume of $H_2O$ equal to the volume of the original organic solvent. The solid N,N′-dimethyl-4,4′-dipyridylium bis-[tetrakis(1 - phenylundecane - 1,3 - diono)thulium(III)] chelate salt which forms is isolated, washed with solvent, and dried.

At least 4 molar proportions of nonadecane-9,11-dione are mixed with at least 4 molar proportions of 4-methylpiperidine together with enough acetone or ethanol to effect solution. To this solution, preferably stirred, is added 1 molar proportion of neodymium(III) chloride dissolved in 5 ml. of $H_2O$. Precipitation of the product is completed by adding to the reaction mixture a volume of $H_2O$ equal to the volume of the original organic solvent. The solid 4-methylpiperidinium tetrakis(nonadecane-9,11-diono)-neodymium(III) chelate salt which forms is isolated, washed with solvent, and dried.

At least 4 molar proportions of 1-thienylbutane-1,3-dione, 8 ml. of 1 N NaOH, and at least 1 molar proportion of N,N-diethylpiperidinium chloride are mixed together with enough acetone or ethanol to effect solution. The this solution, preferably stirred, is added 1 molar proportion of europium(III) nitrate dissolved in 5 ml. of $H_2O$. Precipitation of the product is completed by adding to the reaction mixture a volume of $H_2O$ equal to the volume of the original organic solvent. The solid N,N - diethylpiperidinium tetrakis(1 - thienylbutane-1,3-diono)europium(III) chelate salt which forms is isolated, washed with solvent, and dried.

At least 4 molar proportions of 9-methyloctadecane-8,10-dione are mixed with at least 4 molar proportions of 4-ethylpiperidine together with enough acetone or ethanol to effect solution. To this solution, preferably stirred, is added 1 molar proportion of promethium(III) chloride dissolved in 5 ml. of $H_2O$. Precipitation of the product is completed by adding to the reaction mixture a volume of $H_2O$ equal to the volume of the original organic solvent. The solid 4-ethylpiperidinium tetrakis-(9 - methyloctadecane-8,10-diono)promethium(III) chelate salt which forms is isolated, washed with solvent, and dried.

At least 4 molar proportions of 1-furylbutane-1,3-dione, 8 ml. of 1 N NaOH, and at least 1 molar proportion of N,N-dimethylpiperidinium bromide are mixed together with enough acetone or ethanol to effect solution. To this solution, preferably stirred, is added 1 molar proportion of lanthanum(III) nitrate dissolved in 5 ml. of $H_2O$. Precipitation of the product is completed by adding to the reaction mixture a volume of $H_2O$ equal to the volume of the original organic solvent. The solid N,N - dimethylpiperidinium tetrakis(1 - furylbutane-1,3-diono)lanthanum(III) chelate salt which forms is isolated, washed with solvent, and dried.

At least 4 molar proportions of 1-(4-nitrophenyl)-4,4,4-trifluorobutane-1,3-dione are mixed with at least 4 molar proportions of tripropylamine together with enough acetone or ethanol to effect solution. To this solution, preferably stirred, is added 1 molar proportion of erbium(III) chloride dissolved in 5 ml. of $H_2O$. Precipitation of the product is completed by adding to the reaction mixture a volume of $H_2O$ equal to the volume of the original organic solvent. The solid tripropylammonium tetrakis(1-(4-nitrophenyl)-4,4,4-trifluorobutane-1,3-diono)erbium(III) chelate salt which forms is isolated, washed with solvent, and dried.

At least 4 molar proportions of 1-(3-nitrophenyl)-4,4,4-trifluorobutane-1,3-dione, 8 ml. of 1 N NaOH, and at least 1 molar proportion of tetraisopropylammonium chloride are mixed together with enough acetone or ethanol to effect solution. To this solution, preferably stirred, is added 1 molar proportion of terbium(III) chloride dissolved in 5 ml. of $H_2O$. Precipitation of the

---

[1] J.A.C.S. 84, 5560, 5572 (Nov. 5, 1962).

product is completed by adding to the reaction mixture a volume of $H_2O$ equal to the volume of the original organic solvent. The solid tetraisopropylammonium tetrakis(1 - (3 - nitrophenyl) - 4,4,4 - trifluorobutane-1,3-diono)terbium(III) chelate salt which forms is isolated, washed with solvent, and dried.

At least 4 molar proportions of 1-phenyl-2-trifluoromethyl-4,4,4-trifluorobutane-1,3-dione are mixed with at least 4 molar proportions of diethylamine together with enough acetone or ethanol to effect solution. To this solution, preferably stirred, is added 1 molar proportion of gadolinium(III) chloride dissolved in 5 ml. of $H_2O$. Precipitation of the product is completed by adding to the reaction mixture a volume of $H_2O$ equal to the volume of the original organic solvent. The solid diethylammonium tetrakis(1-phenyl-2-trifluoromethyl-4,4,4-trifluorobutane-1,3-diono) gadolinium(III) chelate salt which forms is isolated, washed with solvent, and dried.

At least 4 molar proportions of 1-phenyl-3-(2-pyridyl)-propane-1,3-dione, 8 ml. of 1 N NaOH, and at least ½ molar proportion of $CaCl_2$ are mixed together with enough acetone or ethanol to effect solution. To this solution, preferably stirred, is added 1 molar proportion of lutetium(III) chloride dissolved in 5 ml. of $H_2O$. Precipitation of the product is completed by adding to the reaction mixture a volume of $H_2O$ equal to the volume of the original organic solvent. The solid calcium bis-[tetrakis(1 - phenyl-3-(2 - pyridyl)propane - 1,3 - diono)-lutetium(III)] chelate salt which forms is isolated, washed with solvent, and dried.

At least 4 molar proportions of 1,3-di(4-nitrophenyl)-propane-1,3-dione are mixed with at least 4 molar proportions of triisopropylamine together with enough acetone or ethanol to effect solution. To this solution, preferably stirred, is added 1 molar proportion of neodymium(III) chloride dissolved in 5 ml. of $H_2O$. Precipitation of the product is completed by adding to the reaction mixture a volume of $H_2O$ equal to the volume of the original organic solvent. The solid triisopropylammonium tetrakis (1,3-di(4-nitrophenyl)propane-1,3-diono)neodymium(III) chelate salt which forms is isolated, washed with solvent and dried.

At least 4 molar proportions of 1,3-di(4-pyridyl)-propane-1,3-dione, 8 ml. of 1 N NaOH, and at least 1 molar proportion of tetra-n-heptylammonium chloride are mixed together with enough acetone or ethanol to effect solution. To this solution, preferably stirred, is added 1 molar proportion of samarium(III) chloride dissolved in 5 ml. of $H_2O$. Precipitation of the product is completed by adding to the reaction mixture a volume of $H_2O$ equal to the volume of the original organic solvent. The solid tetra-n-heptylammonium tetrakis(1,3 - di(4 - pyridyl)propane-1,3-diono)samarium(III) chelate salt which forms is isolated, washed with solvent, and dried.

At least 4 molar proportions of dibenzoylmethane are mixed with at least 4 molar proportions of KOH together with enough acetone or ethanol to effect solution. To this solution, preferably stirred, is added 1 molar proportion of actinium(III) chloride dissolved in 5 ml. of $H_2O$. Precipitation of the product is completed by adding to the reaction mixture a volume of $H_2O$ equal to the volume of the original organic solvent. The solid potassium tetrakis(dibenzoylmethane)actinium(III) chelate salt which forms is isolated, washed with solvent, and dried.

At least 4 molar proportions of 1,3-didurylpropane-1,3-dione are mixed with at least 2 molar proportions of ethylenediamine together with enough acetone or ethanol to effect solution. To this solution, preferably stirred, is added 1 molar proportion of praesodymium(III) chloride dissolved in 5 ml. of $H_2O$. Precipitation of the product is completed by adding to the reaction mixture a volume of $H_2O$ equal to the volume of the original organic solvent. The ethylenediammonium bis[tetrakis(1,3-didurylpropane-1,3-diono)praesodymium(III)] chelate salt which forms is isolated, washed with solvent, and dried.

At least 4 molar proportions of 1-(4-methoxy)-3-(4-nitrophenyl)propane-1,3-dione are mixed with at least 4 molar proportions of n-heptylamine together with enough acetone or ethanol to effect solution. To this solution, preferably stirred, is added 1 molar proportion of europium(III) chloride dissolved in 5 ml. of $H_2O$. Precipitation of the product is completed by adding to the reaction mixture a volume of $H_2O$ equal to the volume of the original organic solvent. The solid n-heptylammonium tetrakis-(1-(4-methoxy)-3-(4-nitrophenyl)propane - 1,3 - diono)-europium(III) chelate salt which forms is isolated, washed with solvent, and dried.

At least 4 molar proportions of tricosane-11,13-dione are mixed with at least 4 molar proportions of 4-propylpiperidine together with enough acetone or ethanol to effect solution. To this solution, preferably stirred, is added 1 molar proportion of samarium(III) chloride dissolved in 5 ml. of $H_2O$. Precipitation of the product is completed by adding to the reaction mixture a volume of $H_2O$ equal to the volume of the original organic solvent. The solid 4-propylpiperidinium tetrakis(tricosane-11,13-diono)samarium(III) chelate salt which forms is isolated, washed with solvent, and dried.

At least 4 molar proportions of 1,3-(2,4-dimethylphenyl)propane-1,3-dione, 8 ml. of 1 N NaOH, and at least 1 molar proportion of N-propylpyridinium bromide are mixed together with enough acetone or ethanol to effect solution. To this solution, preferably stirred, is added 1 molar proportion of lutetium(III) chloride dissolved in 5 ml. of $H_2O$. Precipitation of the product is completed by adding to the reaction mixture a volume of $H_2O$ equal to the volume of the original organic solvent. The solid N-propylpyridinium tetrakis(1,3-(2,4-dimethylphenyl)propane-1,3-diono) - lutetium(III) chelate salt which forms is isolated, washed with solvent, and dried.

The new tetrakis rare earth metal chelate anion salts of the present invention, wherein the rare earth metal is formally trivalent and octacoordinate, are generically useful as selective ultraviolet absorption agents and therefore useful as ultraviolet screens in decelerating the ultraviolet-induced decomposition of many compositions. This utility is expressly shown in the experimental results of Table 5 in which solutions of the indicated cation rare earth metal tetrakis chelate anion salt were prepared in n-propyl acetate. In most instances, the chelate anion salt was not completely soluble, and accordingly to avoid optical diffusion or diffraction problems, the compositions were filtered before their absorption characteristics were examined. The resultant filtered clear solutions were placed in transparent vessels and the absorption thereof measured in a commercial spectrophotometer (Cary Model 14). As indicated in the following tabular data, maximum absorptions, i.e., γmax, were obtained. It is to be appreciated that, because of the just mentioned insolubility, the maximum reported peak absorptions are in fact minimal. The extinction coefficients ($k$) for these various materials were then determined at this γmax and the vessels containing the solutions were then exposed to radiation in a commercial Fade-O-meter (page 280, "The Van Nostrand Chemist's Dictionary," D. Van Nostrand Co., New York, 1953) for 80 hours. The thus exposed vessels and clear solutions were removed and the extinction coefficients ($k$) thereof redetermined again at the original indicated γmax.

From practical experience it has been determined that the commercial requirements for ultraviolet absorbers, i.e., ultraviolet screening agents, are that they absorb light strongly in at least part of the region 2900–3800 A., but not in the visible and preferably little, of any, in the 3800–4000 A. region. High absorption in the 3200–3500 A. region is especially desirable. The molar extinction coefficients ($\epsilon$=molar ext. coef.; $\epsilon$=kmw.) are desirable in the region 10,000–15,000. It is desirable to have a loss in extinction coefficient of less than about 20% after the said Fade-O-meter exposures.

The following experimental results with the indicated chelate anion salts show their desirable properties for this utility.

TABLE 5

| Chelate Anion Salt | $\gamma_{max}$ | $k\gamma_{max}$ Before Exposure | $k\gamma_{max}$ After Exposure | Loss in $k\gamma_{max}$ percent |
| --- | --- | --- | --- | --- |
| Potassium tetrakis(1,3-diphenylpropane-1,3-diono)europium | 3,410 | 87.1 | 74.3 | 15 |
| Triethylammonium tetrakis(1,3-diphenylpropane-1,2-diono)europium | 3,400 | 78.2 | 69.3 | 11 |
| Piperidinium tetrakis-(1-phenyl-1,3-butanediono)europium | 3,070 | 66.6 | 55.8 | 16 |
| Potassium tetrakis(2,4-pentanediono)europium | 2,710 | 60.8 | 50.6 | 17 |
| Tetraethylammonium tetrakis(1,1,1-trifluoro-4-phenyl-2,4-butanediono)europium | 3,250 | 55.6 | 42.9 | 23 |

Because of their ultraviolet light-absorptive qualities, the present novel compounds may be used as photostabilizers for modified natural polymers, addition and condensation polymers and copolymers, and for mixtures of modified natural polymers. Examples of condensation polymers are the macromolecular polyesters, polyamides, polycarbonates, and polyurethanes, and examples of addition polymers are polyethylene, polypropylene, polystyrene, polyvinyl chloride, polyvinyl fluoride, polyvinylidene fluoride, polyvinyl acetate, propionate, and butyrate, polyacrylonitrile, polymethacrylonitrile, polymethyl acrylate and methacrylate copolymers of ethylene with such other polymerizable monomers as carbon monoxide, vinyl acetate, vinyl chloride, acrylo- and methacrylonitrile, methyl acrylate and methacrylate, acrylic and methacrylic acids, maleic and fumaric acids, and the like, copolymers of styrene with the aforementioned monomers, polyvinylpyrrolidone, polyvinyl succinimide, polyvinyltrimethyl acetate, and the like.

Examples of modified natural polymers are nitrocellulose, cellulose acetate, propionate, and butyrate, regenerated cellulose, and the like.

For use as a photostabilizer, the chelate is usually employed in an amount less than about 10% by weight, and generally from 0.01 to about 5% by weight.

The method by which the chelate is incorporated into the polymer is not critical and any method may be used. Thus, the chelate may be added before, during, or after polymerization, or before or during spinning, or it can be added to fiber, film, or finished product. Irrespective of how the subject chelates are incorporated in the polymer, they become an integral part of the polymer, chemically or physically.

In the case of condensation polymers, the chelate can be added to the initial charge and the condensation polymerization then carried on. Alternatively, the chelate can be added to preformed polymer. The resulting polymer is useful per se as a photostable composition and it can also be employed to impart photostability to light-unstable polymers simply as an additive or as a copolymer component.

Since obvious modifications and equivalents in the invention will be evident to those skilled in the chemical arts, we propose to be bound solely by the appended claims.

The embodiments of the invention in which an exclusive property or privilege is claimed are defined as follows:

1. A salt, in which the anion is a rare earth metal chelate, of the formula $$Q^{n+}[M(Lig)_4]_n^-$$

wherein:
 (1) Q is a cation of valence $n$;
 (2) $n$ is an integer from 1 to 6;
 (3) M is a tervalent rare earth metal selected from those having one of atomic numbers 57–71 and 89–103; and
 (4) (Lig)$_4$ is four 1,3-dioxocarbonyl moieties which need not be the same.

2. A salt in which the anion is europium(III) chelated with four β-diketone moieties which need not be the same.

3. A salt in which the anion is terbium(III) chelated with four β-diketone moieties which need not be the same.

4. A salt in which the anion is neodymium(III) chelated with four β-diketone moieties which need not be the same.

5. A salt in which the anion is lanthanum(III) chelated with four β-diketone moieties which need not be the same.

6. A salt in which the anion is praseodymium(III) chelated with four β-diketone moieties which need not be the same.

7. A salt in which the anion is samarium(III) chelated with four β-diketone moieties which need not be the same.

8. A salt in which the anion is gadolinium(III) chelated with four β-diketone moieties which need not be the same.

9. A salt in which the anion is dysprosium(III) chelated with four β-diketone moieties which need not be the same.

10. A salt in which the anion is holmium(III) chelated with four β-diketone moities which need not be the same.

11. A salt in which the anion is erbium(III) chelated with four β-diketone moities which need not be the same.

12. A salt in which the anion is tetrakis(1,3-diphenyl-1,3-propanediono)europium(III).

13. A salt in which the anion is tetrakis(1-methyl-3-phenyl-1,3-propanediono)auropium(III).

14. A salt in which the anion is tetrakis(1,1,1-trifluoro-4-(2-thienyl)-2,4-butanediono)europium(III).

15. A salt in which the anion is tetrakis(1,1,1-trifluoro-4-(2-thienyl)-2,4-butadediono)terbium(III).

16. A salt in which the anion is tetrakis(1,1,1,5,5,5-hexafluoro-2,4-pentanediono)europium(III).

17. A salt in which the anion is tetrakis(1,1,1-trifluoro-3-phenyl-1,3-propanediono)europium(III).

18. A salt in which the anion is tetrakis(1,1,1-trifluoro-3-phenyl-1,3-propanediono)terbium(III).

19. A salt in which the anion is tetrakis(1,1,1,5,5,5-hexafluoro-2,4-pentanediono)neodymium(III).

20. A salt in which the anion is tetrakis(1,1,1,5,5,5-hexafluoro-2,4-pentadeniono)lanthanium(III).

No references cited.

REUBEN EPSTEIN, *Primary Examiner.*

CARL D. QUARFORTH, *Examiner.*

L. A. SEBASTIAN, *Assistant Examiner.*